(12) United States Patent
Shayer

(10) Patent No.: US 8,694,813 B2
(45) Date of Patent: Apr. 8, 2014

(54) EFFICIENT STORAGE POWER MANAGEMENT

(75) Inventor: David Allan Shayer, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 750 days.

(21) Appl. No.: 12/873,929

(22) Filed: Sep. 1, 2010

(65) Prior Publication Data

US 2012/0054516 A1 Mar. 1, 2012

(51) Int. Cl.
*G06F 1/32* (2006.01)

(52) U.S. Cl.
USPC .......................................... 713/323; 713/320

(58) Field of Classification Search
USPC ................................. 713/323, 320
See application file for complete search history.

(56) References Cited

U.S. PATENT DOCUMENTS

| 5,428,579 | A | 6/1995 | Robinson et al. |
| 7,002,884 | B2 | 2/2006 | Schmidt et al. |
| 7,082,373 | B2 * | 7/2006 | Holle ............................. 702/60 |
| 7,120,806 | B1 * | 10/2006 | Codilian et al. ............. 713/320 |
| 2003/0070065 | A1 | 4/2003 | Fleming |
| 2007/0025195 | A1 | 2/2007 | Oh et al. |

\* cited by examiner

*Primary Examiner* — Albert Wang
(74) *Attorney, Agent, or Firm* — Fish & Richardson P.C.

(57) ABSTRACT

Devices and methods for storage power management that depend at least partly on the operational component requesting access to the storage. For example, an electronic device may include storage and data processing circuitry. The storage may be capable of being activated and deactivated. The data processing circuitry may be configured to include several operational components and to obtain data from the storage upon request by the operational components. Additionally, the data processing circuitry may manage when the storage is activated and deactivated. In particular, the data processing circuitry may manage when the storage is activated and deactivated according to a first storage power management scheme when a first of the operational components (e.g., an operating system component) requests the data and according to a second storage power management scheme when a second of the operational components (e.g., an application program component) requests the data.

21 Claims, 9 Drawing Sheets

EFFICIENT STORAGE POWER MANAGEMENT

BACKGROUND

The present disclosure relates generally to power management for an electronic device and, more particularly, to power management for storage of an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Portable and desktop electronic devices alike increasingly provide a variety of functionalities, such as audio and video playback, photo display, calendar tracking, note-taking, voice recording, and so forth. Performing some or all of these functionalities may involve processing data using a processor, storing the data in memory, and/or reading from or writing to storage of the electronic device. While activated, the processor, memory, and storage each consume some amount of power. This power consumption may not only increase the cost of operating the electronic device, but in the case of a portable electronic device, also may reduce the battery life of the electronic device.

A variety of techniques have been developed to reduce power consumption to improve power efficiency and battery life. Some techniques may involve blindly deactivating the nonvolatile storage after some period of inactivity. While doing so may reduce some power consumption, at times the storage may be left on when it is unnecessary to do so, and at other times the storage may be switched off just before the storage needs to be accessed. Certain other techniques may involve allowing each application program running on the electronic device to control when the storage is activated or deactivated. However, certain application programs may provide more effective power management than others. In addition, if only one application program erroneously maintains the storage in an activated state, the storage may remain powered on, consuming power.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for storage power management that depend at least partly on the operational component requesting access to the storage. For example, an electronic device may include storage and data processing circuitry. The storage may be capable of being activated and deactivated. The data processing circuitry may be configured to include several operational components and to obtain data from the storage upon request by the operational components. Additionally, the data processing circuitry may manage when the storage is activated and deactivated. In particular, the data processing circuitry may manage when the storage is activated and deactivated according to a first storage power management scheme when a first of the operational components (e.g., an operating system component) requests the data and according to a second storage power management scheme when a second of the operational components (e.g., an application program component) requests the data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
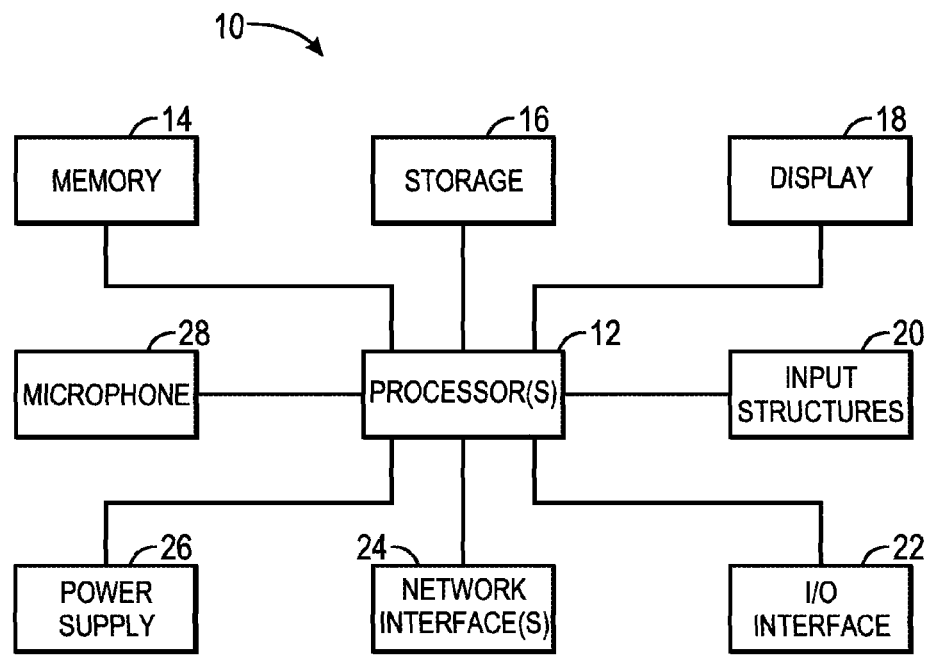
FIG. 1 is a schematic block diagram of an electronic device capable of performing the disclosed storage power management techniques, in accordance with an embodiment.
Figure 3:
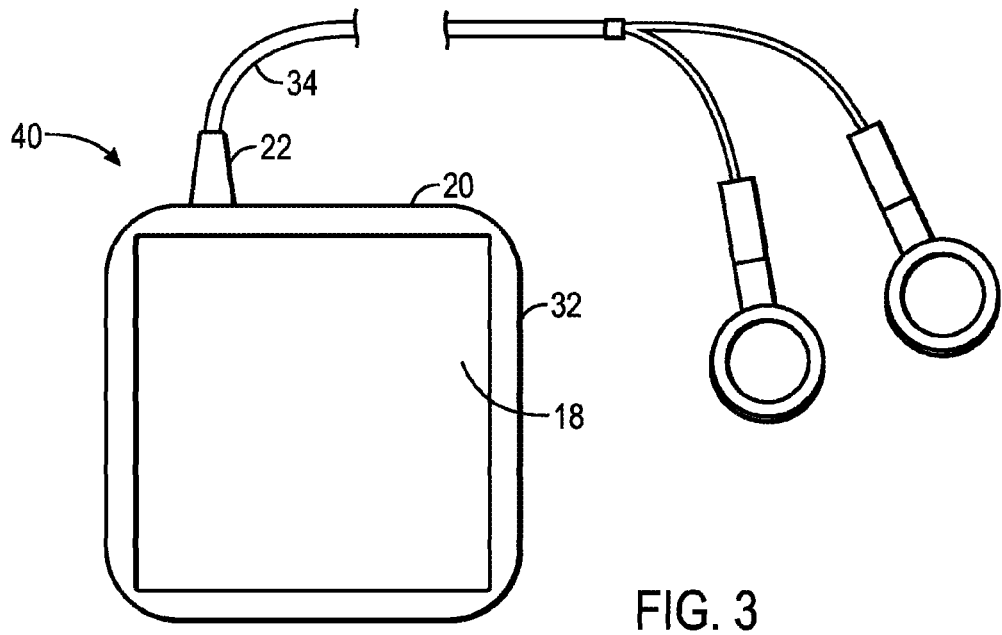
FIG. 3 is a perspective view of another handheld electronic device having the capabilities of the electronic device of FIG. 1, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to electronic devices with improved device storage power management, which may take into account the type of access being sought by the various functions of the electronic device. For example, as discussed below, an electronic device may keep storage activated only as long as a function of the operating system is requesting access, but may keep the storage activated for some additional timeout period when an application is requesting access in case the same or another application requests access in succession. Additionally or alternatively, the electronic device may vary how storage power is managed depending on the requesting application and/or other factors or depending on the occurrence of one or more expected device operation events.

Modern electronic devices may provide a vast number of functionalities, such as music and video playback, photo display and management, contact management, calendar management, and so forth. Generally, these functionalities may occur as applications that run above an operating system on the electronic device, in which the operating system may provide a framework for the various applications to perform these functionalities. That is, as used herein, the terms "application," "application program," "application component," and the like refer to any hardware, software, and/or firmware that, alone or in combination, provide a functionality of the electronic device other than that provided by an operating system of the electronic device. The term "application" may distinguished from the terms "operating system," "operating system component," and the like in that the operating system is a component of the electronic device implemented in hardware, software, and/or firmware that, alone or in combination, provides a framework for an application to run on the electronic device. The operating system and applications may be understood to be components of "data processing circuitry," which may be embodied wholly or in part as software, firmware, hardware, or any combination thereof. Furthermore, such data processing circuitry may be a single contained processing module or may be incorporated wholly or partially within any of the other elements within electronic device. In general, the terms "component," "operational component," and the like refer to hardware, software, and/or firmware that, alone or in combination, perform a particular function. For example, an operating system component and an application program component may be understood to be operational components.

During operation, the operating system and/or the applications running on the operating system may request access to data saved in some form of nonvolatile storage on the electronic device. Because such access is not needed at all times, leaving the storage in a permanently active state would result in unnecessary power consumption. In portable electronic devices, such additional power consumption may reduce the effective battery life of the electronic device. As such, a "disk channel" may be opened just prior to accessing the storage, which may cause the storage and any associated device controllers to become activated. As used herein, the term "disk channel" denotes a component of hardware, software, and/or firmware that, alone or in combination, may cause the storage to become activated when at least one disk channel is open and deactivated when all disk channels are closed. Once all of the requested data has been obtained from the storage, closing the disk channel my cause the storage and its associated device controllers to become deactivated, conserving power. That is, to "activate" the storage means to place the storage into an active state that enables access to data stored on the storage, while to "deactivate" the storage means to place the storage into a lower-power-consumption state that may provide limited or no access to the data stored thereon.

The process of activating the storage does not immediately make the storage available for access. Rather, when the storage is activated from a deactivated state, the storage may undergo a period of latency while the storage is initialized. During such an initialization period, the storage may be consuming power, but may not be capable of providing access to the data stored within. Likewise, when the storage is deactivated from the activated state, the storage may undergo a period of latency while the storage is closed down. As such, simply deactivating the storage as soon as access has ceased and activating the storage when another request for access occurs may be inefficient when the other request for access occurs within these latency periods. Any delay that occurs between closing a disk channel and the deactivation of the storage may be understood not to be purposeful, in contrast to a timeout period during which a disk channel may be kept open after access has ceased.

Although the operating system of the electronic device may be optimized for power efficiency by avoiding such inefficiencies in activating and deactivating the storage, the applications that provide the various functionalities of the electronic device may not be so optimized, and occasionally may fail to properly manage the power of the storage. Thus, according to present embodiments, certain components of the operating system may control the opening and closing of their own disk channels to activate and deactivate the storage when operating-system-level access to the storage is requested.

On the other hand, since the applications may not always be as efficient as the operating system, a single application-level storage access and power management component may control a single disk channel to activate and deactivate the storage when application-level accesses to the storage are requested. As used herein, the term "application-level storage access and power management component" and the like refers to any hardware, software, and/or firmware that, alone or in combination, controls power management of the storage of the electronic device to be activated or deactivated (e.g., according to one or more application-level storage power management schemes). That is, as used herein, the term "storage power management scheme" refers to a framework for managing storage power consumption. For example, as discussed below, an "application-level storage power management scheme" may involve waiting a timeout period before closing a disk channel after application-level storage access has ceased, while an "operating-system-level storage power management system" may involve closing a disk channel immediately after operating-system-level access has ceased.

In some embodiments, the application-level storage access and power management component may be a file system, which the various applications may use to obtain data from storage. By unifying the power management of the device storage for application-level accesses into the application-level storage access and power management component, a single inefficient or erroneous application may not alone result in excessive power consumption. Moreover, by distinguishing between operating system and application storage accesses, storage device power management may be more efficient than merely applying a single storage device power management scheme to all types of disks accessed. Namely, rather merely apply a single timeout to all types of accesses to the storage undertaken by the operating system may be controlled according to one power management scheme, while accesses to storage undertaken by an application may invoke another storage device power management scheme.

In some embodiments, the application-level storage access power management scheme may involve activating the device storage after an application requests disk access, but not necessarily closing the disk channel and deactivating the storage until after some timeout period. If another request for disk access occurs within the timeout period, either by the same or a different application, the disk channel may remain open until that disk access has completed, whereupon the timeout period may begin anew. The precise timeout period may be fixed or may vary depending any suitable variety of factors. For example, the timeout period may be increased or decreased depending upon which application last requested data, an amount of historical disk access activity, a current user activity status, a current device operation mode, current operations taking place in the background of the electronic device, a current voice recording status, and/or a current radio playback status for the electronic device.

Additionally or alternatively, the application-level storage access power management scheme may involve activating and/or deactivating the storage based at least partly on the occurrence of one or more device operation events. As used herein, such a "device operation event" refers to an event that may reasonably reliably indicate that a subsequent request for disk access is not likely to occur and the storage power efficiency will be served by immediately deactivating the storage. For example, when an application that typically issues three disk access requests in rapid succession, the application-level storage access and power management component may open the disk channel and activate the storage device after the first access request, but may wait until the third disk access has ceased before closing the disk channel and deactivate the storage device, with or without an additional timeout period. In other embodiments, the unified application-level storage access and power management component may open the disk channel when an application requests such disk access, but may not close the disk channel as long as a user status is active (e.g., the user's thumb remains on the surface of the electronic device).

With the foregoing in mind, FIG. 1 represents a block diagram of an electronic device 10 configured to perform the present techniques for storage power management. Among other things, the electronic device 10 may include processor(s) 12, memory 14, nonvolatile storage 16, a display 18, input structures 20, an input/output (I/O) interface 22, network interface(s) 24, a power source 26, and/or a microphone 28. The various functional blocks shown in FIG. 1 may represent hardware, software, and/or firmware elements. It should be noted that FIG. 1 is merely one example of a particular implementation and is intended to illustrate the types of components that may be present in the electronic device 10.

In general, the processor(s) 12 may govern the operation of the electronic device 10. In the electronic device 10 of FIG. 1, the processor(s) 12 may be operably coupled with the memory 14 and the nonvolatile storage 16 to perform certain programs or instructions for carrying out the presently disclosed techniques. Such programs or instructions executed by the processor(s) 12 may be stored in any suitable article of manufacture that includes one or more tangible, computer-readable media at least collectively storing the instructions or routines, such as the memory 14 and the nonvolatile storage 16. The article(s) of manufacture may include, for example, the memory 14 and/or the nonvolatile storage 16. The memory 14 and the nonvolatile storage 16 may include any suitable articles of manufacture for storing data and executable instructions, such as random-access memory, read-only memory, rewritable flash memory, hard drives, and optical discs.

The display 18 may be a flat panel display, such as a liquid crystal display (LCD). Additionally, the display 18 may represent one of the input structures 20. Specifically, the display 18 may serve as a capacitive-touch-sensitive display capable of detecting projected capacitive touch (PCT) touch input gestures. By way of example, the display 18 may have a Multi-Touch™ interface, and may be capable of detecting such touch input gestures as a "swipe," "hold," and/or certain touch input gestures involving more than one simultaneous touch. Other input structures 20 may include, for example, keys, buttons, and/or switches. The I/O ports 22 of the electronic device 10 may enable the electronic device 10 to transmit data to and receive data from other electronic devices 10 and/or various peripheral devices, such as external keyboards or mice. The network interface(s) 24 may enable personal area network (PAN) integration (e.g., Bluetooth), local area network (LAN) integration (e.g., Wi-Fi), and/or wide area network (WAN) integration (e.g., 3G). In some embodiments, the network interface(s) 24 also may include a broadcast radio receiver to enable reception of streaming audio, such as FM radio audio. The power source 26 of the electronic device 10 may be any suitable source of power, such as a rechargeable lithium polymer (Li-poly) battery and/or alternating current (AC) power converter. A microphone 28 may allow a user to record voice notes, issue voice commands, and so forth.

Figure 2:
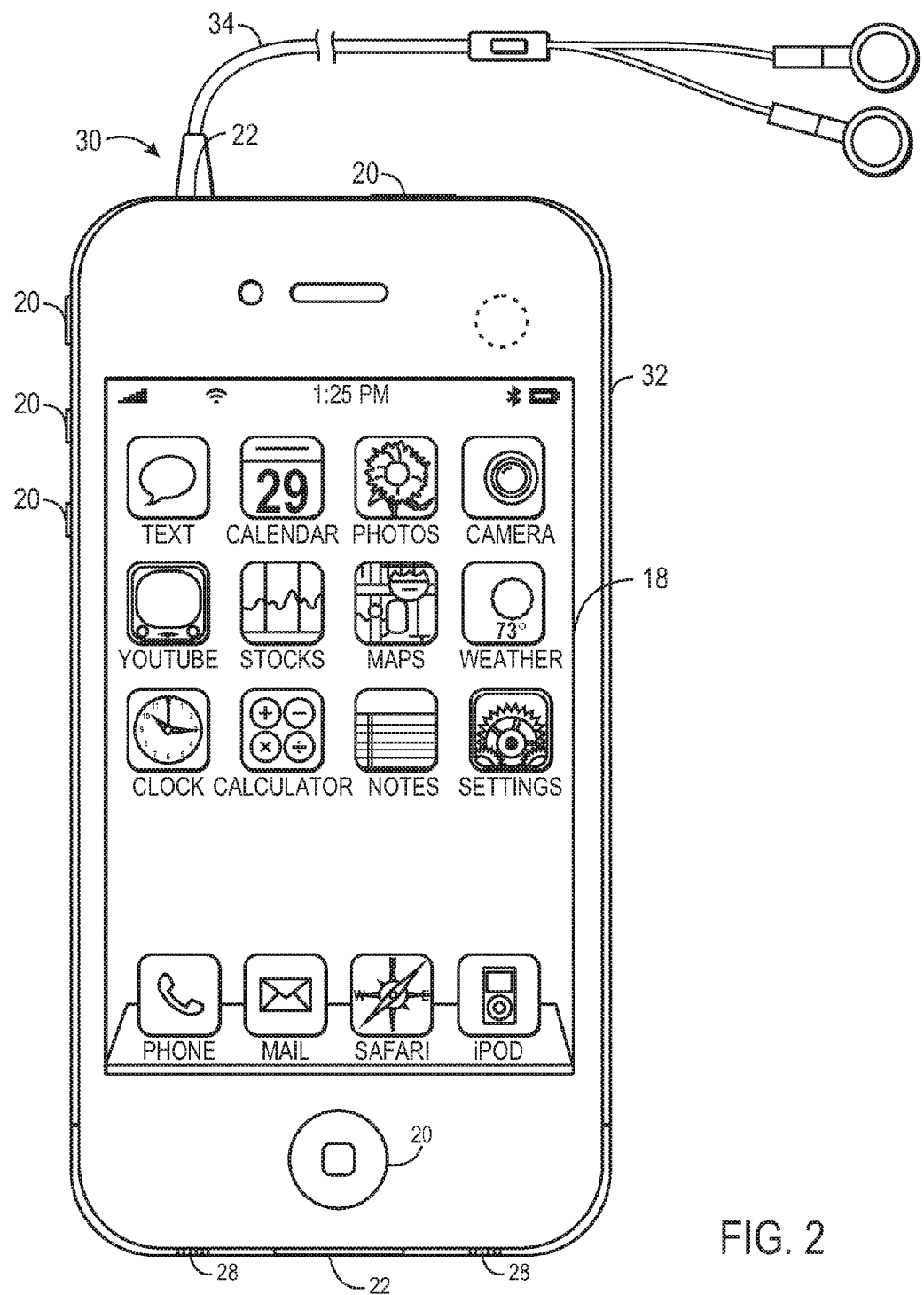
FIG. 2 is a perspective view of a handheld electronic device having the capabilities of the electronic device of FIG. 1, in accordance with an embodiment.

FIG. 2 illustrates an electronic device 10 in the form of a handheld device 30. The handheld device 30 may incorporate the functionality of one or more types of devices, such as a media player, a cellular phone, a gaming platform, a personal data organizer, and so forth. By way of example, the handheld device 30 may be a model of an iPod® or iPhone® available from Apple Inc. of Cupertino, Calif.

The handheld device 30 may include an enclosure 32 or body that protects the interior components from physical damage and shields them from electromagnetic interference. The enclosure 32 may be formed from any suitable material, such as plastic, metal or a composite material, and may allow certain frequencies of electromagnetic radiation to pass through to wireless communication circuitry within handheld device 30 to facilitate wireless communication. The enclosure 32 may also include user input structures 20 through which a user may interface with the device. Each user input structure 20 may be configured to help control a device function when actuated. For example, in a cellular telephone implementation, one or more input structures 20 may be configured to invoke a "home" screen or menu to be displayed, to toggle between a sleep and a wake mode, to silence a ringer for a cell phone application, to increase or decrease a volume output, and so forth.

The display 18 may display a graphical user interface (GUI) that allows a user to interact with the handheld device 30. To this end, the display 18 may be a capacitive touch screen capable of detecting various touch input gestures (e.g., a Multi-Touch™ interface), including multiple simultaneous touch input gestures. Icons of the GUI may be selected via a touch screen included in the display 18, or may be selected by one or more input structures 20, such as a wheel or button. The handheld device 30 also may include various I/O ports 22 that allow connection of the handheld device 30 to external devices. For example, one I/O port 22 may be a port that allows the transmission and reception of data or commands between the handheld device 30 and another electronic device, such as a computer. Such an I/O port 22 may be a proprietary port from Apple Inc. or may be an open standard I/O port. Another I/O port 22 may include a headphone jack to allow a headset 34 to connect to the handheld device 30. One or more microphones 28 may allow a user to record voice notes, issue voice commands, and so forth.

The electronic device 10 of FIG. 1 also may take the form of a compact media player 40. By way of example, the compact media player 40 may be an iPod® by Apple Inc. The compact media player 40 may include a display 18 of a relatively small size (e.g., less than approximately 2 square inches). Like the display 18 of the handheld device 30, the display 18 of the compact media player 40 may be a capacitive touch screen capable of detecting touch input gestures, including multiple simultaneous touch input gestures (e.g., a Multi-Touch™ interface). The compact media player 40 may further include one or more input structures 20, such as an on-off button or a lock button. An I/O interface 22 of the compact media player 40 may enable a headset 34 to connect to the compact media player 40. Additionally, the I/O interface 22 may enable the compact media player 40 to intercommunicate with another electronic device, such as a desktop or laptop computer.

Figure 4:
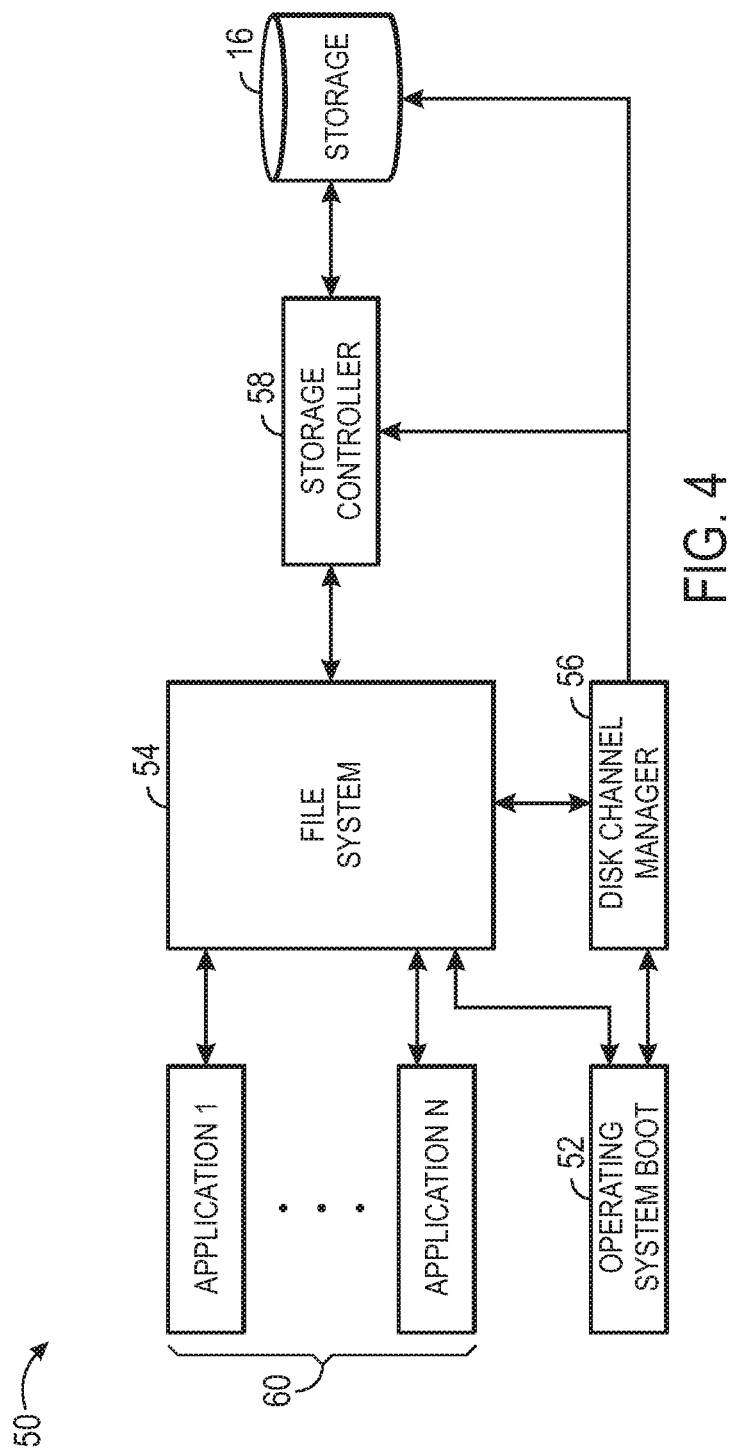
FIG. 4 is a schematic block diagram of a storage access and power management system that may be used by the electronic device of FIG. 1, in accordance with an embodiment.

The electronic device 10, whether in the form of the handheld device 30 or the compact media player 40, may provide a variety of functionalities (e.g., music and video playback, photo display and management, and so forth) using the storage 16 in a power-efficient manner. Turning to FIG. 4, a storage access and power management system 50 having various components implemented in hardware, software, and/or firmware, may provide data to various requesting components while managing the power consumption of the storage 16. The storage access and power management system 50 may control the power management of the storage 16 using a first storage access power management scheme when a component of the operating system of the electronic device 10 (e.g., an operating system boot component 52) requests access to data on the storage 16, while using a second storage access power management scheme when an application (e.g., an application 60) requests access to data on the storage 16.

For example, when an operating system boot component 52 requests access to the storage 16 while the operating system is booting up, the operating system boot component 52 may control when the storage 16 is activated or deactivated. Specifically, the operating system boot component 52 may request data directly from the storage 16 and/or via a file system 54 at the same time or after causing the storage 16 to become activated. That is, the operating system boot component 52 may open a disk channel via a disk channel manager component 56, which may cause the storage 16 and an associated storage controller 58 to become activated. The operating system boot component 52 may maintain the disk channel open while access until the requested data is obtained. Thereafter, the operating system boot component 52 may close the disk channel, causing the disk channel manager component 56 to cause the storage 16 and the storage controller 58 to begin to deactivate.

It should be noted that once a disk channel is opened in the disk channel manager component 56, the storage 16 does not immediately become available for data access. Rather, when the disk channel manager component 56 begins to activate the storage 16 from a deactivated state when a disk channel is opened, the storage 16 and/or the storage controller 58 may undergo a period of latency while being initialized. During such an initialization period, the storage 16 and storage controller 58 may be consuming power, but may not be capable of providing access to the data stored within. Likewise, when the disk channel manager component 56 begins to deactivate the storage 16 from an activated state when a disk channel is closed, the storage 16 and/or the storage controller 58 may undergo a period of latency while being closed down. As with the initialization period, the storage 16 and storage controller 58 may be consuming power, but may not be capable of providing access to the data stored within while being closed down. As such, simply deactivating the storage 16 as soon as access has ceased and activating the storage 16 when another request for access occurs may be inefficient when the next request for access occurs within these latency periods. Since the operating system boot component 52 may typically request access for data in the storage in a well-defined manner, the operating system boot component 52 generally may be capable of efficiently managing the power of the storage 16 according to its own storage access power management scheme.

By contrast, not all of the applications 60 may be as efficient storage power managers as the operating system boot component 52. Indeed, the various functionalities provided by the applications 60 (here labeled 1-N), such as music and video playback, photo display and management, and so forth, may result in many uncoordinated requests for access to the storage 16. If each application 60 controlled its own disk channel, opening and closing the disk channel each time data was obtained from the storage, some requests for storage access would inevitably occur immediately after another application 60 had just closed the disk channel, the latency period during which no data could be accessed from the storage 16 while the storage 16 closed down. Even a single application 60, if not optimized for storage power management, could close its disk channel immediately before another request for access to the storage 16.

Accordingly, in the storage access and power management system 50 of FIG. 4, the applications 60 may not directly control their own disk channels through the disk channel manager component 56. Rather, the file system 54 may serve as a unified application-level storage access and power management component to provide a second device storage power management scheme for disk accesses requested by the application 60. As will be discussed below, this second device storage power management scheme may be different from the device storage power management scheme performed by the operating system boot component 52. Although the file system 54 is illustrated as the unified application-level storage access and power management component, it should be appreciated that a component other than the file system 54 may perform this role in other embodiments. In addition, in some embodiments, not all of the applications 60 may be assigned to the same unified application-level storage access and power management component. That is, in some embodiments, a first application-level storage access and power management component may control the access to and power management of the storage 16 and the storage controller 58 (e.g., via a first application-level device storage power management scheme and a first disk channel), while a second application-level storage access and power management component may control access and power management for the storage 16 and the storage controller 58 for a second subset of the application 60 (e.g., via a second application-level device storage power management scheme and a second disk channel). In some of these embodiments, the file system 54 may represent each of these application-level storage access and power management components.

In the storage access and power management system 50 of FIG. 4, when an application 60 requests data currently located on the storage 16, the application 60 may issue a disk access request to the file system 54. If the storage 16 and/or the storage controller 58 are currently deactivated, the file system 54 may open a disk channel through the disk channel manager component 56, causing the storage 16 and the storage controller 58 to become activated. Thereafter, the file system 54 may request the data that was requested by the application 60 from the storage controller 58, which may obtain and provide such data to the file system 54, which then may provide this requested data to the requesting application 60. Since the storage 16 is no longer being accessed, to remain activated could unnecessarily consume additional power unless a subsequent disk access is about to occur. Thus, the file system 54, acting as a unified application-level storage access and power management component, may determine when to deactivate the storage 16 by closing the disk channel according to the device storage power management scheme.

Several manners of operating the storage access and power management system 50 according to various device storage power management schemes are provided below. For example, as shown by a timing diagram 70 of FIG. 5, the file system 54 may open a disk channel for the duration of a disk access plus some timeout period, unless another disk access occurs. Meanwhile, the operating system boot component 52 may open a disk channel only for the duration of its own disk access. The timing diagram 70 of FIG. 5 compares the activities of two applications 60, labeled application 1 and application 2, the file system 54, the operating system boot component 52, and the storage 16 power status.

At time $t_A$ in the timing diagram 70, the operating system boot component 52 may issue a request for disk access 72 and may open a disk channel 74 at approximately the same time, causing the storage 16 to become active 76. When the disk access terminates at time $t_B$, the operating system boot component 52 may close the disk channel 74 because no further disk accesses are to be requested by the operating system boot component 52. When the disk channel 74 is closed, the storage 16 may become deactivated.

As mentioned above, application-level disk accesses may involve a different device storage power management scheme than that carried out by the operating system boot component 52. As shown specifically in the timing diagram 70, the file system 54 may not necessarily close a disk channel immediately after a disk access requested by an application 60 has ended because not all applications 60 may be as efficient storage power managers as the operating system boot component 52. At $t_C$, a first application 60 may issue a request for a disk access 78 to the file system 54. In response, the file system 54 may open a disk channel 80, causing the storage 16 and the storage controller 58 to become active 82. When the disk access 78 has ended at $t_D$, the file system 54 may not necessarily immediately close the disk channel 80. Rather, the file system 54 may begin a timeout period 84. Since no applications 60 requests disk access before the timeout period 84 completes at $t_E$, the file system may close the disk channel 80 at $t_E$, and the storage 16 may become inactive at $t_E$ as well.

Figure 5:
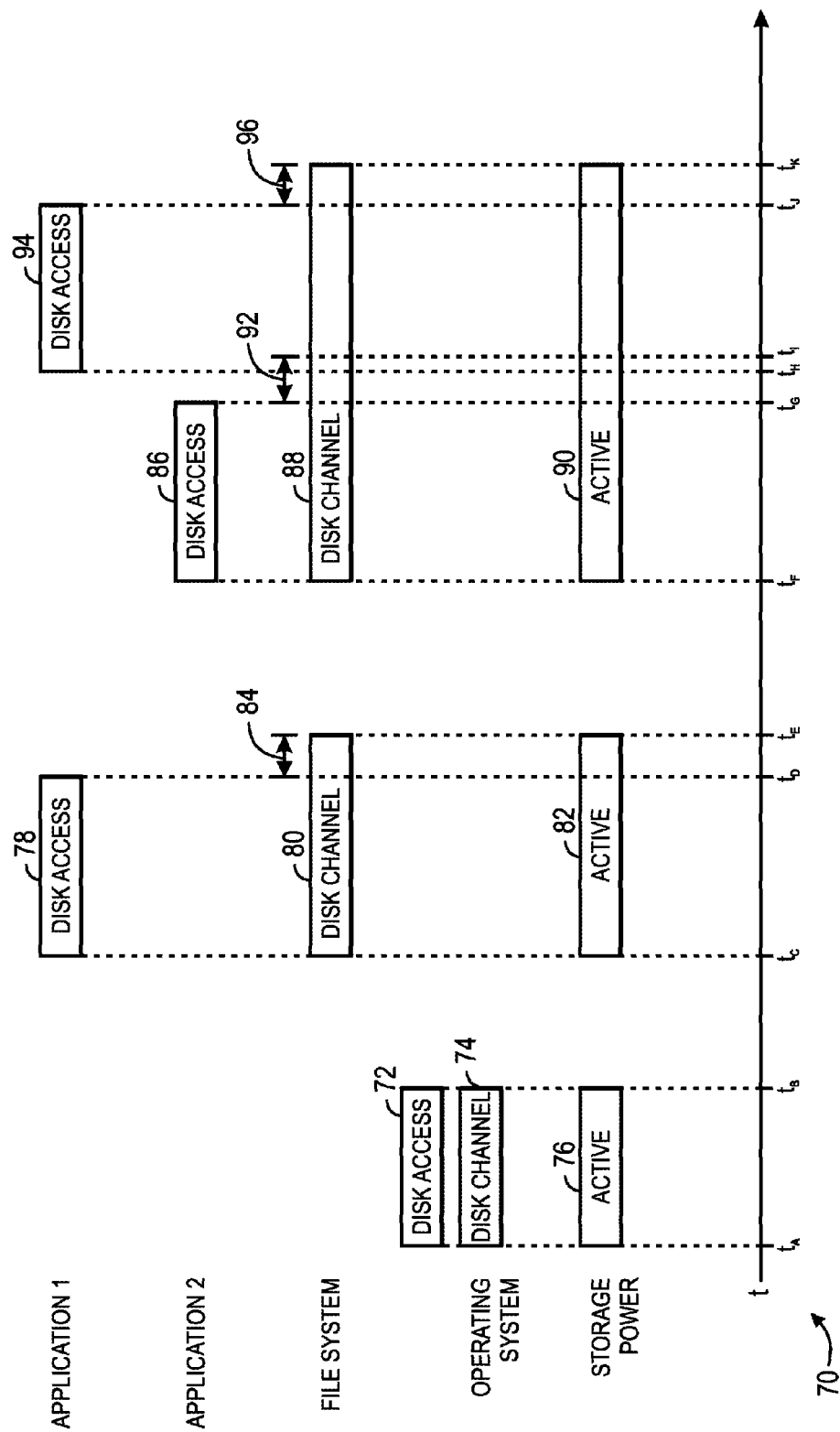
FIG. 5 is a timing diagram representing one example of a manner of operating the storage access and power management system of FIG. 4, in accordance with an embodiment.

In the timing diagram 70 of FIG. 5, a second application 60 is shown to request disk access 86 at $t_F$. Consequently, the file system 54 may open a disk channel 88, causing the storage 16 to become active 90. When the disk access 86 terminates at $t_G$, the file system 54 may begin a timeout period 92, so as to close the disk channel 88 if no access occurs before the timeout period 92 would be complete. At $t_H$, a time that occurs before the end of the timeout period 92 at $t_I$, the first application may issue a request for disk access 94. The disk access 94 ends at $t_J$, and the file system 54 may begin another timeout period 96. Since no additional disk accesses are requested before $t_K$, when the timeout period 96 completes, the file system 54 subsequently closes the disk channel 88, and the storage 16 and its associated storage controller 58 are deactivated. As will be discussed below, the timeout periods 84, 92 and 96 may be a fixed value of time (e.g., 30 ms) and/or may vary depending on a variety of factors.

Figure 6:
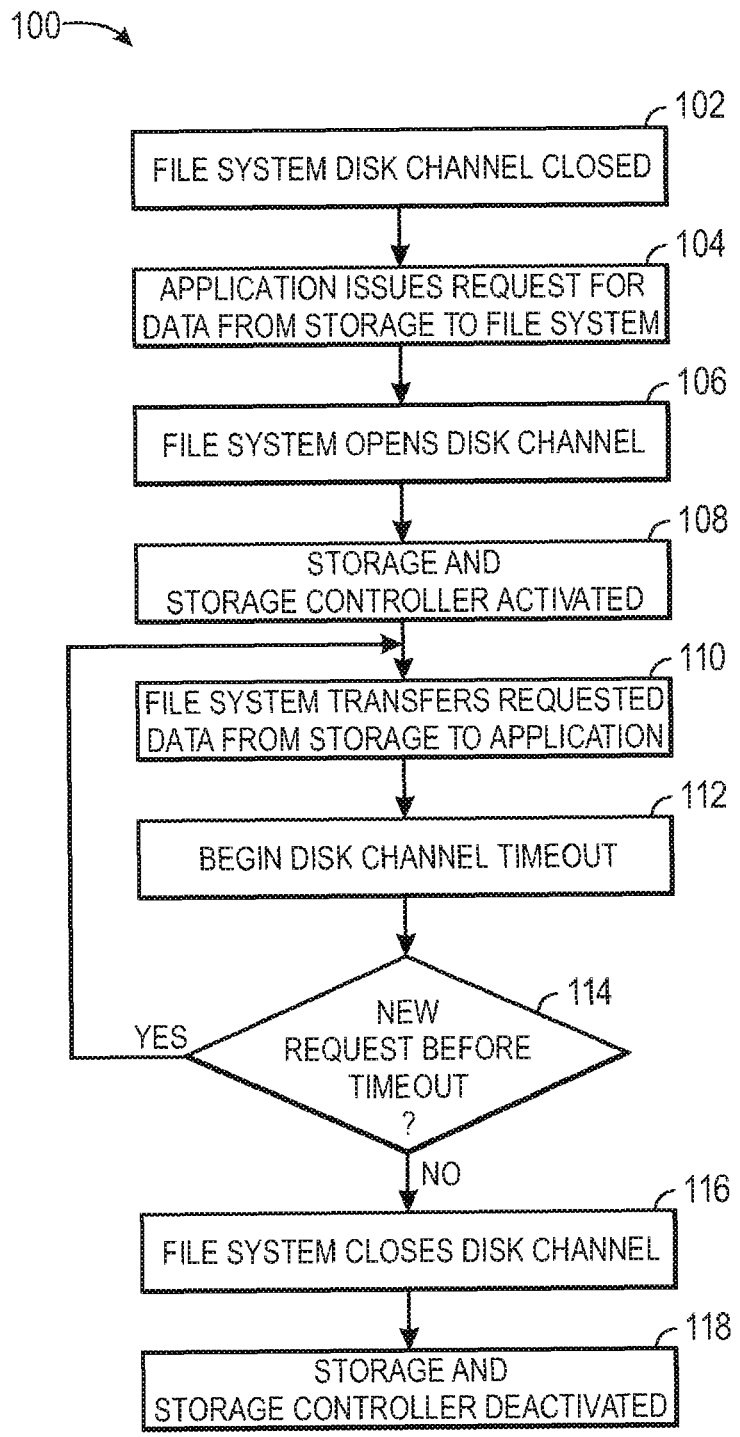
FIG. 6 is a flowchart describing an embodiment of a method for performing storage accesses and power management according to the example of FIG. 5.

A flowchart 100 shown in FIG. 6 represents one embodiment of a method for performing such storage access and power management described in the example of FIG. 5. The flowchart 100 may begin when all disk channels, including the disk channel controlled by the file system 54, are closed and the storage is in a deactivated state (block 102). When an application 60 issues a request for data from the storage 16 to the file system 54 (block 104), the file system 54 may open a disk channel through the disk channel manager component 56 (block 106). When the disk channel is open, the storage 16 and the storage controller 58 may become activated and able to transfer data to the file system 54 (block 108).

Next, the file system 54 may obtain the requested data from the storage 16 and provide the data to the requesting application (block 110). The disk access now complete, the file system 54 may begin a disk channel timeout period (block 112). As will be discussed below, the disk channel timeout period begun by the file system 54 may be a fixed value or may vary depending on any suitable number of factors, such as those discussed below with reference to FIG. 7.

If the same or another application issues a new request for disk access before the disk channel timeout period is complete (decision block 114), the storage access and power management system 50 may carry out blocks 110 and 112 once more. If the file system 54 does not receive any new disk access requests before the disk channel timeout period (decision block 114), the file system 54 may close the disk channel (block 116), causing the storage 16 and the storage controller 58 to become deactivated (block 118), provided no other disk channels have been open (e.g., by a component of the operating system such as the operating system boot component 52).

Figure 7:
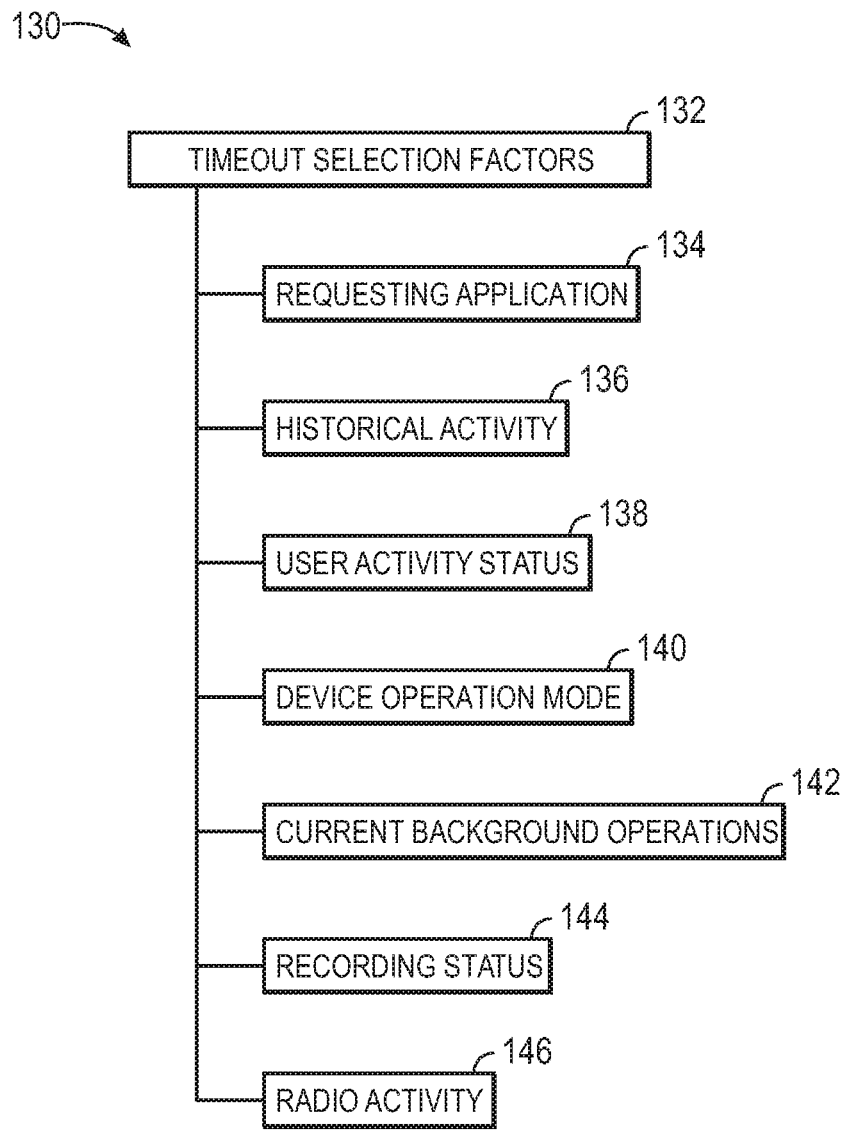
FIG. 7 is a diagram listing a variety of factors that may be employed by the device storage access and power management system of FIG. 4 to determine a storage access timeout period, in accordance with an embodiment.

As noted above, the timeout period applied by the file system 54 may be fixed or may vary depending on one or more factors. FIG. 7 illustrates a factor diagram 130 representing a variety of such timeout period selection factors 132 that may be used by the file system 54 and/or other data processing circuitry to determine the extend of the timeout period applied by the file system 54. It should be appreciated that the timeout period selection factors 132 illustrated in the factor diagram 130 are intended to be exemplary and not exhaustive. Indeed, any suitable factors may be used in determining the extent of the timeout period following the end of a disk access.

A first of the timeout period selection factors 132 may be the particular requesting application 134. That is, certain applications 60 generally may exhibit known data access patterns, and knowing which application 60 is requesting access to the storage 16 may indicate whether the application 60 is likely to request access in the near future (e.g., within the latency period between closing down and initializing the storage 16). By way of example, if a first application 60 frequently requests multiple disk accesses in rapid succession, the first factor 134 may weigh in favor of a longer timeout period to reduce the likelihood that the storage 16 becomes deactivated just before a disk access is requested. In another example, if a second application 60 frequently requests disk access only once, with long periods of time before any subsequent requests for disk access, the first factor 134 may weigh in favor of a shorter timeout period because a subsequent disk access is less likely.

A second factor 136 of the timeout period selection factors 132 may be the historical activity of the electronic device 10 or of certain applications 60. That is, because a given electronic device 10 may operate following certain predictable patterns, the file system 54 and/or other data processing circuitry may select a timeout period depending at least partly on the likelihood that a subsequent disk access will occur given historical disk access patterns. In a first example, if a user typically views a large number of photos in rapid succession when using a photo application on the electronic device, the second factor 136 may weigh in favor of a longer timeout period when a photo application requests disk access. In another example, when a user typically views only one photo at a time, the second factor 136 may weigh in favor of a shorter timeout period when the photo application is being used on the electronic device 10, since a subsequent request for disk access is less likely.

A third factor 138 of the timeout period selection factors 132 may be a user activity status. Specifically, the electronic device 10 may be capable of detecting when a user is actively interacting with the electronic device 10 (e.g., scrolling through an audio play list of music) as opposed to passively using the electronic device (e.g., listing to music). By way of example, when a user is actively interacting with the electronic device 10, the third factor 138 may weigh in favor of a longer timeout period because a subsequent disk access is more likely. Likewise, when the user is passively using the electronic device 10, the third factor 138 may weigh in favor of a shorter timeout period, since a subsequent disk access is less likely to occur.

A fourth factor 140 of the timeout period selection factors 132 may be a current operation mode of the electronic device 10. In particular, the electronic device 10 may be capable of operating in a variety of modes, such as an athletic mode (e.g., Nike+), a standby mode, and so forth. By way of example, when the electronic device 10 is operating in an athletic mode, the fourth factor 140 may weigh in favor of longer timeout periods because increased data transfer is likely.

A fifth factor 142 of the timeout period selection factors 132 may be a consideration of the various background operations currently being undertaken by the electronic device 10. Specifically, even though the device operation mode may be in a standby mode, various background operations may be taking place on the electronic device. These background operations may include, for example, certain of the applications 60 running in the background or various actions undertaken by the operating system of the electronic device 10. Since the presence of these background operations running on the electronic device 10 may increase the likelihood of subsequent disks accesses, the fifth factor 142 may weigh in favor of a longer timeout period when more background operations are running on the electronic device 10. Likewise, the fifth factor 142 may weigh in favor of a reduced timeout period when few background operations are running on the electronic device 10.

Sixth and seventh factors 144 and 146 of the timeout period selection factors 132 may be a device recording status and a radio play back activity of the electronic device, respectively. Since the occurrence of voice recording or radio play back may increase the likelihood of disk accesses, when such activities are occurring, the factors 144 and 146 may weigh in favor of a longer timeout period. When these activities are not occurring, the factors 144 and 146 may weigh in favor of a shorter timeout period.

In some embodiments, the file system 54 may carry out a device storage power management scheme that relies on the occurrence of one or more device operation events. For example, consider an example in which an application 60 typically requests disk access a certain number of times before stopping for a period of inactivity. Under such circumstances, when the application 60 requests disk access the first time, the file system 54 may not to close the disk channel until after the application 60 has issued expected number of requests for disk access.

Figure 8:
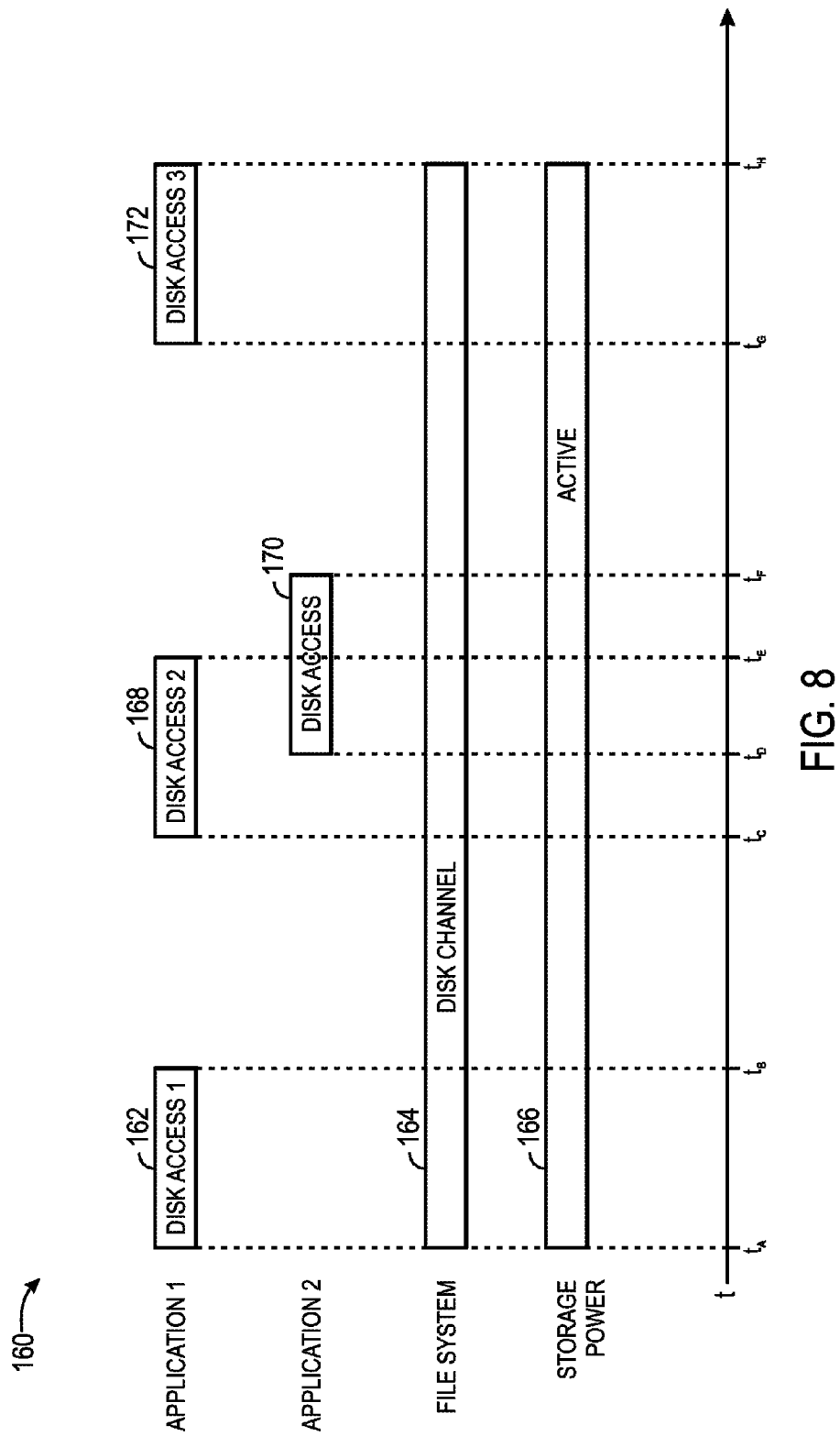
FIGS. 8 and 9 are timing diagrams representing other examples of manners of operating the device storage access and power management system of FIG. 4 based at least partly on the occurrence of a target device operation event, in accordance with an embodiment.

Such a situation is illustrated in a timing diagram 160 of FIG. 8, in which the file system 54 may expect that a first application 60, labeled application 1, typically requests disk access in multiples of three. In the timing diagram 160, the first application 60 is illustrated as initiating a first disk access 162 at a time $t_A$. In response, the file system 54 may open a disk channel 164, causing the storage 16 to become active 166. When the first disk access 162 is complete at $t_B$, the file system 54 may not immediately close the disk channel 164. Rather, because the file system 54 may expect that the first application 60 will provides three disk accesses in succession before pausing for some period of time, the file system 54 may wait until the first application 60 has provided all of the expected disk accesses. Thus, at time $t_C$, when the first application 60 issues a request for a second disk access 168, which terminates at time $t_E$, and when a second application 60 issues a request for a disk access 170 at time $t_D$, terminating at time $t_F$, the file system 54 still may not close the disk channel 164. Instead, after the first application 60 issues a request for a third disk access 172 at time $t_G$, terminating at time $t_H$, will the file system 54 close the disk channel 164, causing the storage 16 power to become deactivated 166. In some embodiments, the file system 54 may not immediately close the disk channel following the occurrence of such a device operation event, but rather may begin a timeout period in the manner described above.

Figure 9:
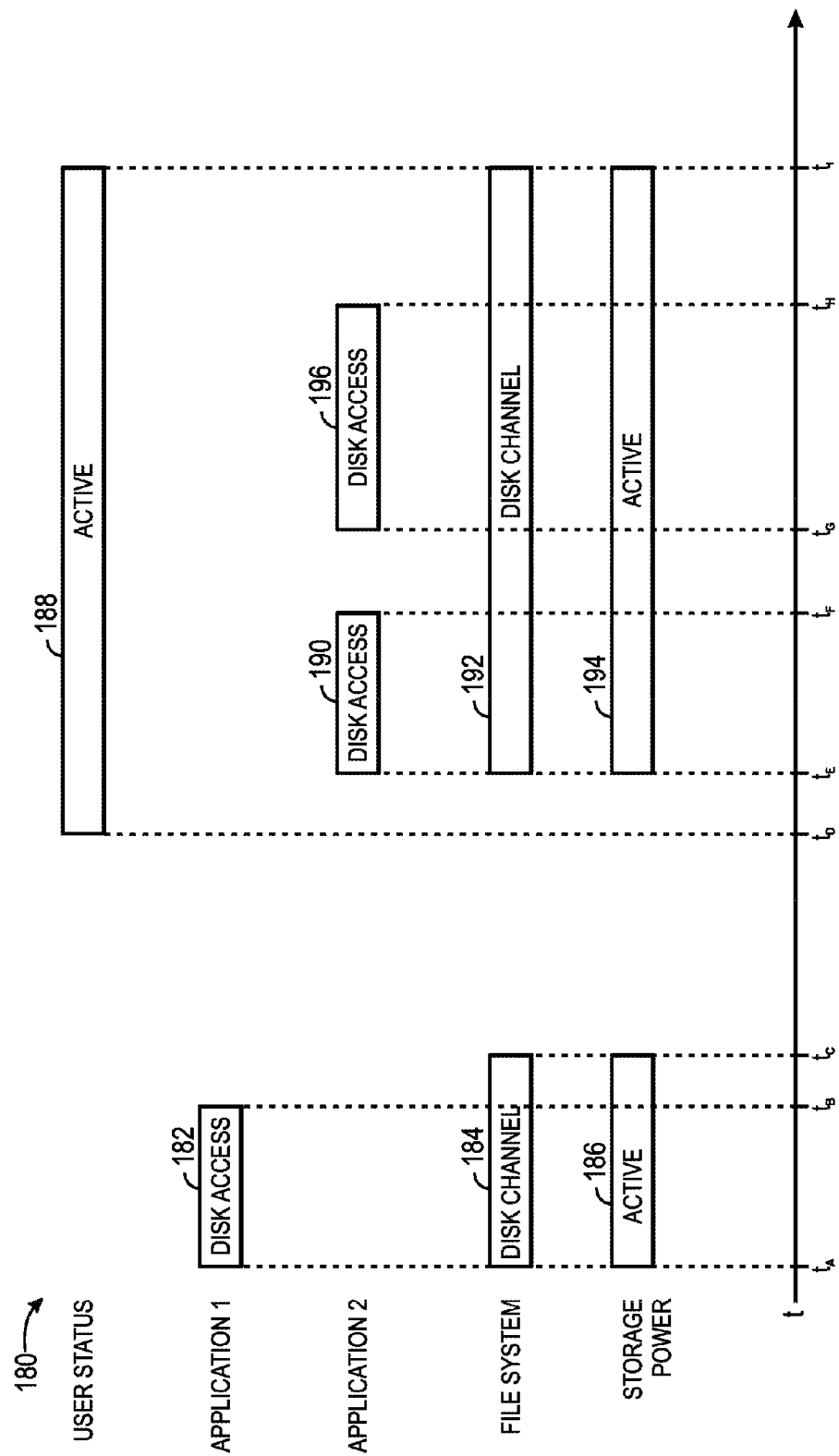

A timing diagram 180 of FIG. 9 represents another example in which the file system 54 may close a disk channel following an expected device operation event. Namely, the file system 54 may choose to keep the storage 16 activated while a user status remains active, deactivating the storage 16 when the user status becomes inactive. The timing diagram 180 also illustrates a manner in which the file system 54 may employ an event-based storage power management scheme in combination with a timeout-period-based storage power management scheme.

In the timing diagram 180, a first application 60 may request disk access 182 at time $t_A$. Accordingly, the file system 54 may open the disk channel 184, causing the storage 16 to become activated 186. When the disk access 182 is terminated at time $t_B$, the file system 54 may begin a timeout period lasting between times $t_B$ and $t_C$. As noted above, such a timeout period may be fixed or may be variable. At a subsequent time $t_D$, the user status of the electronic device 10 may change, becoming active 188. Such a change may occur, for example, when a user begins to navigate a user interface of the electronic device 10 or scroll through a playlist displayed on the display 18 of the electronic device. This change in activity may cause the file system 54 to begin to operate in an event-based device storage power management scheme rather than a timeout-period-based device storage power management scheme. Indeed, when another application 60 issues a request for disk access 190, the file system 54 may open a disk channel 192 to cause the storage 16 to become active 194, but may not close the disk channel 192 when the disk access 190 ends at $t_F$. Rather, because the active user status 188 may indicate that subsequent disk accesses are likely to be occurring in the near future (e.g., as the user causes an application 60 to access the storage 16), the file system 54 may leave the disk channel 192 open, even as a subsequent disk access 196 is requested at $t_G$, and terminates at $t_H$. When the active user status 188 ends at $t_I$, the file system 54 may close the disk channel 192, causing the storage 16 to become deactivated 194.

Figure 10:
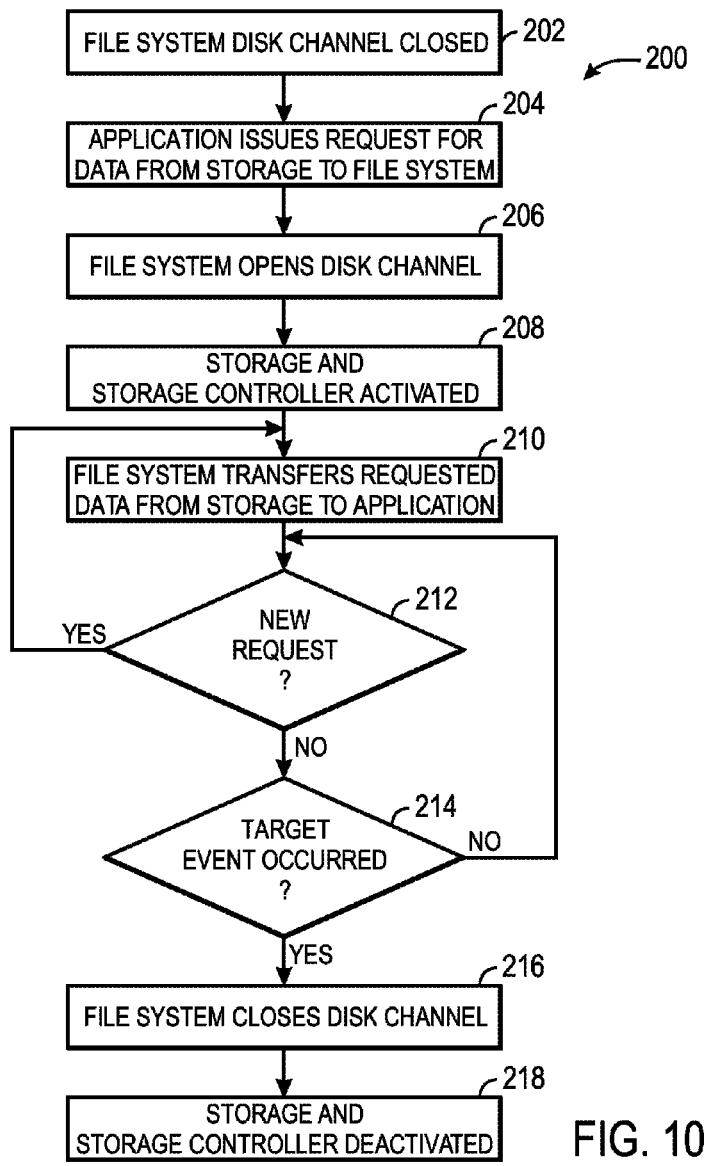
FIG. 10 is a flowchart describing an embodiment of a method for performing device storage accesses and power management according to the examples of FIGS. 8 and 9, in accordance with an embodiment.

A flowchart 200 shown in FIG. 10 represents one embodiment of a method for performing such storage access and power management described in the examples of FIGS. 8 and 9. The flowchart 100 may begin when all disk channels, including the disk channel controlled by the file system 54, are closed and the storage is in a deactivated state (block 202). When an application 60 issues a request for data from the storage 16 to the file system 54 (block 204), the file system 54 may open a disk channel through the disk channel manager component 56 (block 206). When the disk channel is open, the storage 16 and the storage controller 58 may become activated and able to transfer data to the file system 54 (block 208).

Next, the file system 54 may obtain the requested data from the storage 16 and provide the data to the requesting application (block 210). The disk access now complete, the storage access and power management system 50 may carry out block 210 again if the same or another application 60 issues a new request for disk access (decision block 112) before a target device operation event occurs (decision block 214). Thereafter, when the target device operation event occurs (decision block 214), the file system 54 may close the disk channel (block 216), causing the storage 16 and the storage controller 58 to become deactivated (block 218), provided no other disk channels have been open (e.g., by a component of the operating system such as the operating system boot component 52).

Figure 11:
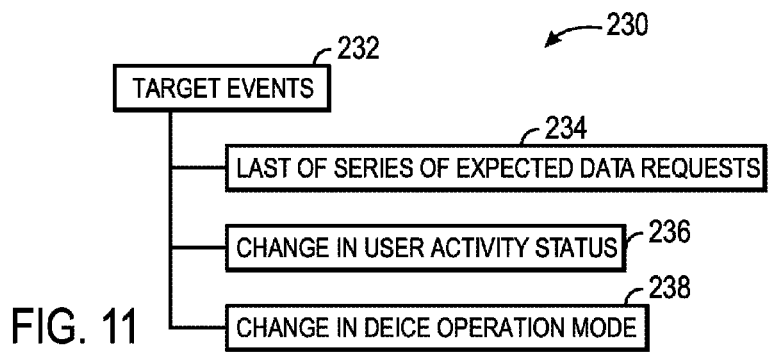
FIG. 11 is a diagram listing a variety of target device operation events used for managing power according to the flowchart of FIG. 10, in accordance with an embodiment.

A variety of target device operation events may trigger the closure of a disk channel, as shown by a target device operation events diagram 230 of FIG. 11. It should be appreciated that these target device operation events 232 may be used alone or in combination in various embodiments. Moreover, the target device operation events shown in FIG. 11 should be understood to be exemplary and not exhaustive.

A first target device operation event 234 of the target device operation events 232 may be the termination of disk access in the last of a series of expected disk access requests (e.g., as illustrated in FIG. 8). That is, for example, if a given application tends to issue a certain number of requests in relatively rapid succession, it would be inefficient to close a disk channel just before another disk access is requested. By way of example, a contact management application may typically request a phone number file, an email address file, and files that include other associated information. The file system 54 may recognize such a request and may close the disk channel only after the last of such disk requests is made.

A second target device operation event 236 of the target device operation events 232 may be a change in user activity status. For example, as discussed above with reference to FIG. 9, a disk channel may be left open after disk access has ceased when a user is actively interacting with the electronic device 10, since subsequent disk access may be likely to occur. By way of example, while a user is navigating a user interface of the electronic device 10, the file system 54 may opt not to close a disk channel after an application request is accessed, as it may be likely that the same or another application will soon request another disk access. However, when the user activity status changes, making the likelihood of a disk access much lower, the disk channel may be closed.

A third target device operation event 238 of the target device operation events 232 may be a change in the operation mode of the electronic device 10. As noted above, the electronic device 10 may operate in a variety of modes, such as an athletic mode (e.g., Nike+), a standby mode, and so forth. In some embodiments, when the device operation mode changes from one in which subsequent disk access requests are more likely to one in which subsequent disk access requests are less likely, the file system 54 may close the disk channel.

The specific embodiments described above have been shown by way of example, and it should be understood that these embodiments may be susceptible to various modifications and alternative forms. For example, it should be appreciated that the techniques described above with reference to the storage 16 also may be employed by any other form of storage, including the memory 14, when such other form of storage may be activated and deactivated to conserve power while the data stored thereon remain. It should be further understood that the claims are not intended to be limited to the particular forms disclosed, but rather to cover all modifications, equivalents, and alternatives falling within the spirit and scope of this disclosure.

What is claimed is:

1. An electronic device comprising:
storage capable of being activated and deactivated; and
data processing circuitry configured to include a plurality of operational components, to obtain data from the storage upon request by the plurality of operational components, and to manage when the storage is activated and deactivated according to a first storage power management scheme when a first of the plurality of operational components requests the data and according to a second storage power management scheme when a second of the plurality of operational components requests the data, wherein the first of the plurality of operational components comprises an operating system component and wherein the second of the plurality of operational components comprises an application program component.

2. The electronic device of claim 1, wherein the data processing circuitry is configured to manage when the storage is activated and deactivated according to the first storage power management scheme by activating the storage when the first of the plurality of operational components requests the data and deactivating the storage when the first of the plurality of operational components has obtained the data and wherein the data processing circuitry is configured to manage when the storage is activated and deactivated according to the second storage power management scheme by activating the storage when the second of the plurality of operational components requests the data and deactivating the storage a period of time after the second of the plurality of operational components has obtained the data.

3. The electronic device of claim 1, wherein the data processing circuitry is configured to manage when the storage is activated and deactivated according to the first storage power management scheme by activating the storage when the first of the plurality of operational components requests the data and deactivating the storage when the first of the plurality of operational components has obtained the data and wherein the data processing circuitry is configured to manage when the storage is activated and deactivated according to the second storage power management scheme by activating the storage when the second of the plurality of operational components requests the data and deactivating the storage upon occurrence of an event after the second of the plurality of operational components has obtained the data.

4. The electronic device of claim 1, wherein the data processing circuitry is configured to manage when the storage is activated and deactivated according to the first storage power management scheme by opening or closing a first disk channel via a disk channel manager component and wherein the data processing circuitry is configured to manage when the storage is activated and deactivated according to the second storage power management scheme by opening or closing a second disk channel via the disk channel manager component.

5. The electronic device of claim 1, wherein the data processing circuitry is configured to manage when the storage is activated and deactivated according to the first storage power management scheme by opening or closing a first disk channel using the first of the plurality of operational components and wherein the data processing circuitry is configured to manage when the storage is activated and deactivated according to the second storage power management scheme by opening or closing a second disk channel using a file system component.

6. A method comprising:
running an operating system and a plurality of application programs on a processor of an electronic device;
when the operating system requests access to storage on the electronic device:
causing the storage to be activated;
obtaining access to the storage; and
when the operating system indicates access to the storage is no longer needed and no application programs of the plurality of application programs request access to the storage, causing the storage to be deactivated without purposeful delay; and
when a first of the plurality of application programs requests access to storage on the electronic device:
causing the storage to be activated;
obtaining access to the storage; and
when the first of the plurality of application programs no longer needs access to the storage and no other application programs of the plurality of application programs are requesting access to the storage, causing the storage to be deactivated after a delay period.

7. The method of claim 6, comprising, when a second of the plurality of application programs requests access to storage on the electronic device during the delay period:
maintaining the storage in an activated state;
obtaining access to the storage; and
when the second of the plurality of application programs no longer needs access to the storage and no other application programs of the plurality of application programs are requesting access to the storage, causing the storage to be deactivated after a second delay period.

8. The method of claim 7, wherein the second delay period comprises the same amount of time as the first delay period.

9. An article of manufacture comprising:
one or more tangible, non-transitory machine-readable storage media having instructions encoded thereon for execution by a processor of an electronic device, the instructions comprising:
instructions to receive, into a file system, a request from an application program to access nonvolatile storage of the electronic device;
instructions to cause the nonvolatile storage to become activated;
instructions to provide access to the nonvolatile storage; and
instructions to cause the nonvolatile storage to become deactivated a period of time after a target device operation event has occurred.

10. The article of manufacture of claim 9, wherein the instructions to cause the nonvolatile storage to become activated comprise opening a disk channel.

11. The article of manufacture of claim 9, wherein the instructions to cause the nonvolatile storage to become deactivated comprise closing a disk channel.

12. The article of manufacture of claim 9, wherein the period of time is fixed.

13. The article of manufacture of claim 9, wherein the period of time is variable depending on one or more factors.

14. The article of manufacture of claim 9, wherein the period of time is longer when another request to access the nonvolatile storage is expected to be received relatively soon and shorter when the other request to access the nonvolatile storage is expected to be received relatively later.

15. The article of manufacture of claim 9, comprising instructions to determine the period of time based at least in part on an identification of the application program, a historical pattern of nonvolatile storage access of the application program, a historical pattern of nonvolatile storage access of the electronic device, a user activity status, an operation mode of the electronic device, a background operation occurring on the electronic device, a voice recording status of the electronic device, or a radio broadcast receiving status of the electronic device, or a combination thereof.

16. The article of manufacture of claim 9, wherein the target device operation event indicates that the application program is unlikely to request access to the nonvolatile storage during a latency period that occurs after deactivating the nonvolatile storage during which the nonvolatile storage is inaccessible.

17. The article of manufacture of claim 9, wherein the target device operation event comprises a cessation of access to specific data of the nonvolatile storage, a change in user activity status, or a change in an operating mode of the electronic device, or a combination thereof.

18. An electronic device comprising:
storage configured to be activated and deactivated; and
data processing circuitry comprising a plurality of components, the plurality of components comprising:
a disk channel manager component configured to cause the storage to be activated when any of a plurality of disk channels is open and to cause the storage to be deactivated when all of the plurality of disk channels are closed;
a first application component configured to issue a first request to access the storage; and
a first application-level storage access and power management component configured to receive the first request to access the storage from the first application, to open a first of the plurality of disk channels, to provide access to the storage, and to close the first of the plurality of disk channels after a first target device operation event occurs.

19. The electronic device of claim 18, wherein the application-level storage access and power management component comprises a file system component.

20. The electronic device of claim 18, wherein the plurality of components comprises an operating system boot component configured to access the storage, to open a second of the plurality of disk channels, to provide access to the storage, and to close the second of the plurality of disk channels immediately after access to the storage has ended.

21. The electronic device of claim 18, wherein the plurality of components comprises a second application component configured to issue a second request to access the storage and a second application-level storage access and power management component configured to receive the second request to access the storage from the second application, to open a third of the plurality of disk channels, to provide access to the storage, and to close the third of the plurality of disk channels after a second target device operation event occurs.

* * * * *